Feb. 26, 1924.
E. S. DEVLIN
1,485,253
UTENSIL FOR THE TREATMENT OF FOODSTUFFS
Filed May 20, 1922
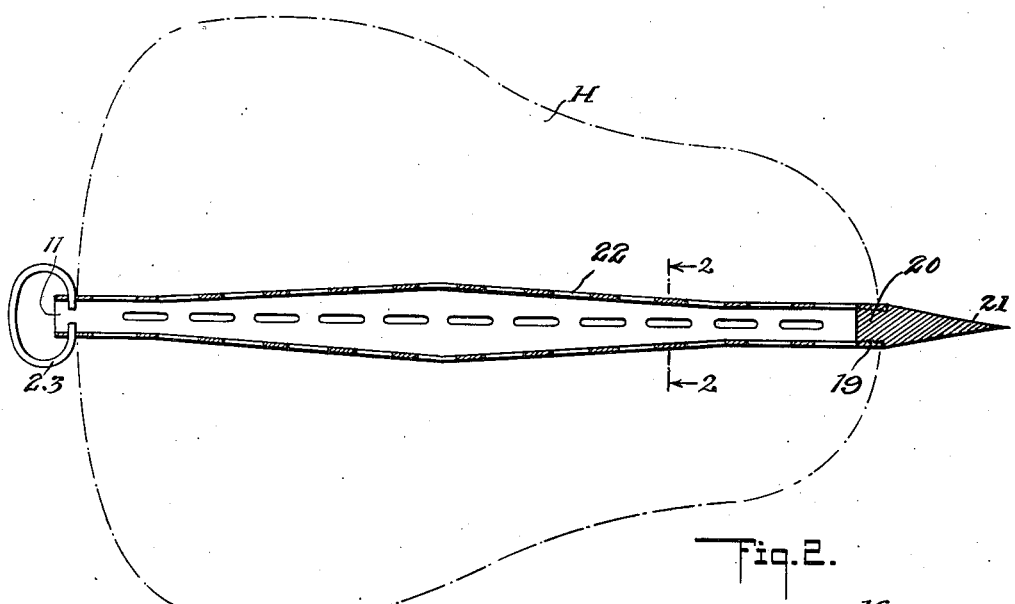
WITNESSES
INVENTOR
Eugene S. Devlin
BY
ATTORNEYS Patented Feb. 26, 1924.

1,485,253

UNITED STATES PATENT OFFICE.

EUGENE S. DEVLIN, OF NEW YORK, N. Y.

UTENSIL FOR THE TREATMENT OF FOODSTUFFS.

Application filed May 20, 1922. Serial No. 562,286.

*To all whom it may concern:*

Be it known that I, EUGENE S. DEVLIN, a citizen of the United States, and a resident of the city of New York, borough of the Bronx, in the county of Bronx and State of New York, have invented a new and Improved Utensil for the Treatment of Foodstuffs, of which the following is a full, clear, and exact description.

This invention has relation to utensils for the treatment of foodstuffs and has particular reference to a utensil for effecting the thorough cooking, curing or corning of foods such as meats, vegetables, fish, poultry, or the like.

Under the present methods and practices employing the common utensils now in general use, it is practically impossible to thoroughly cook the interior of larger articles of food, such as hams, roasts of beef, or the like, without burning or overcooking the exterior. Likewise it has been found that a considerable length of time approximately thirty days, is required in the curing or corning of meats.

To this end it is an object of the present invention to provide a simple and efficient utensil which will insure a more thorough and uniform cooking or treatment of the food interiorly as well as exteriorly in order to eliminate and overcome the above recited objections and disadvantages.

As a further object the invention contemplates a cooking utensil which will greatly expedite the cooking operation or other treatment, thereby effecting economy of fuel, time and labor.

As a still further object the invention contemplates an inexpensive utensil as a new article of manufacture which may be thoroughly cleansed and sterilized after using.

With the above recited and other objects in view, the invention resides in the novel construction set forth in the following specification, particularly pointed out in the appended claim and illustrated in the accompanying drawing, it being understood that the right is reserved to embodiments other than those actually illustrated herein to the full extent indicated by the general meaning of the terms in which the claim is expressed.

In the drawings—

Figure 1 is a longitudinal sectional view of a utensil constructed in accordance with the invention illustrating the use of the same.

Fig. 2 is a transverse sectional view therethrough taken approximately on the line 2—2 of Fig. 1.

Referring to the drawings by characters of reference, the utensil embodies a tubular spike 16, preferably bulged or enlarged in diameter at the center 17 and having an open end 18 and an internally threaded opposite end 19, in which the threaded boss 22 of a tapered and pointed element 21, is screwed. The element 21 facilitates the driving of the spike through the article of food such as a ham H, illustrated in broken lines in Fig. 1. A substantially ring-shaped element 23 or other suitable head is provided at the open end for the purpose of facilitating the removal of the spike or utensil from the article of food when the cooking operation is completed. The tubular spike is provided with openings 22 extending through the walls thereof and indiscriminately scattered throughout its length.

In use and operation, the spike is driven through the ham or other article of food until the tapered element 21 is exposed, when said element is removed to permit of free circulation of the cooking or heating agency through the spike. The ring-shaped element or head serves to limit or prevent the entire entrance of the open end into the article. During the cooking operation or other treatment the heat, boiling water, or other cooking or treating agency, freely passes through the tubular spike or body whereby the same may operate upon the interior of the article being cooked, while the exterior is being similarly operated upon. In this manner a more thorough and uniform cooking or treatment of the article is insured to eliminate rawness at the center, to expedite the cooking operation or other treatment, and to effect an economy of fuel, time and labor.

The bulged or enlarged diameter at the center insures a more thorough and uniform cooking or treatment at the center of the article to be acted upon, which point is the farthest removed from the action of the cooking agency. When the article has been cooked or otherwise treated, the ring-shaped element or head 23 is employed for effecting the removal of the utensil, which may be thoroughly cleansed and sterilized for subsequent use.

I claim:

As a new article of manufacture, a utensil for the treatment of foodstuffs of the character set forth comprising a tubular perforated body of gradually increasing diameter toward its longitudinal center, said body having an open end provided with means for effecting the removal of the body from the article to be treated and provided at its opposite end with a detachable tapered and pointed driving element, as and for the purpose specified.

EUGENE S. DEVLIN.